United States Patent [19]

Wolf et al.

[11] 4,256,948
[45] Mar. 17, 1981

[54] INTEGRAL BEADED STYLUS WIRE AND METHOD OF MAKING SAME

[75] Inventors: Peter H. Wolf, Campbell; Boyd E. Slade, Sunnyvale, both of Calif.

[73] Assignee: Dataproducts Corporation, Woodland Hills, Calif.

[21] Appl. No.: 970,003

[22] Filed: Dec. 15, 1978

[51] Int. Cl.³ .......................... B23K 27/00; B41J 3/00
[52] U.S. Cl. .......................... 219/121 LE; 101/93.05; 219/121 L; 400/124
[58] Field of Search ..... 219/121 L, 121 LM, 121 EB, 219/121 EM; 228/164; 29/482; 400/124; 101/93.05

[56] References Cited

U.S. PATENT DOCUMENTS

| 3,684,474 | 8/1972 | Chisholm | 219/121 LM X |
| 3,718,968 | 3/1973 | Sims et al. | 219/121 LM X |
| 3,826,000 | 7/1974 | Du Rocher et al. | 228/164 X |
| 3,929,214 | 12/1975 | Hebert | 400/124 |

*Primary Examiner*—C. L. Albritton
*Attorney, Agent, or Firm*—Spensley, Horn, Jubas & Lubitz

[57] ABSTRACT

A stylus wire for use in a matrix printhead includes a thin elongated wire with an integral sphere-like head formed at one end. Also disclosed is a method of forming the sphere-like head using a laser or other device to apply high localized heat to the wire end sufficient to form said sphere-like head.

16 Claims, 2 Drawing Figures

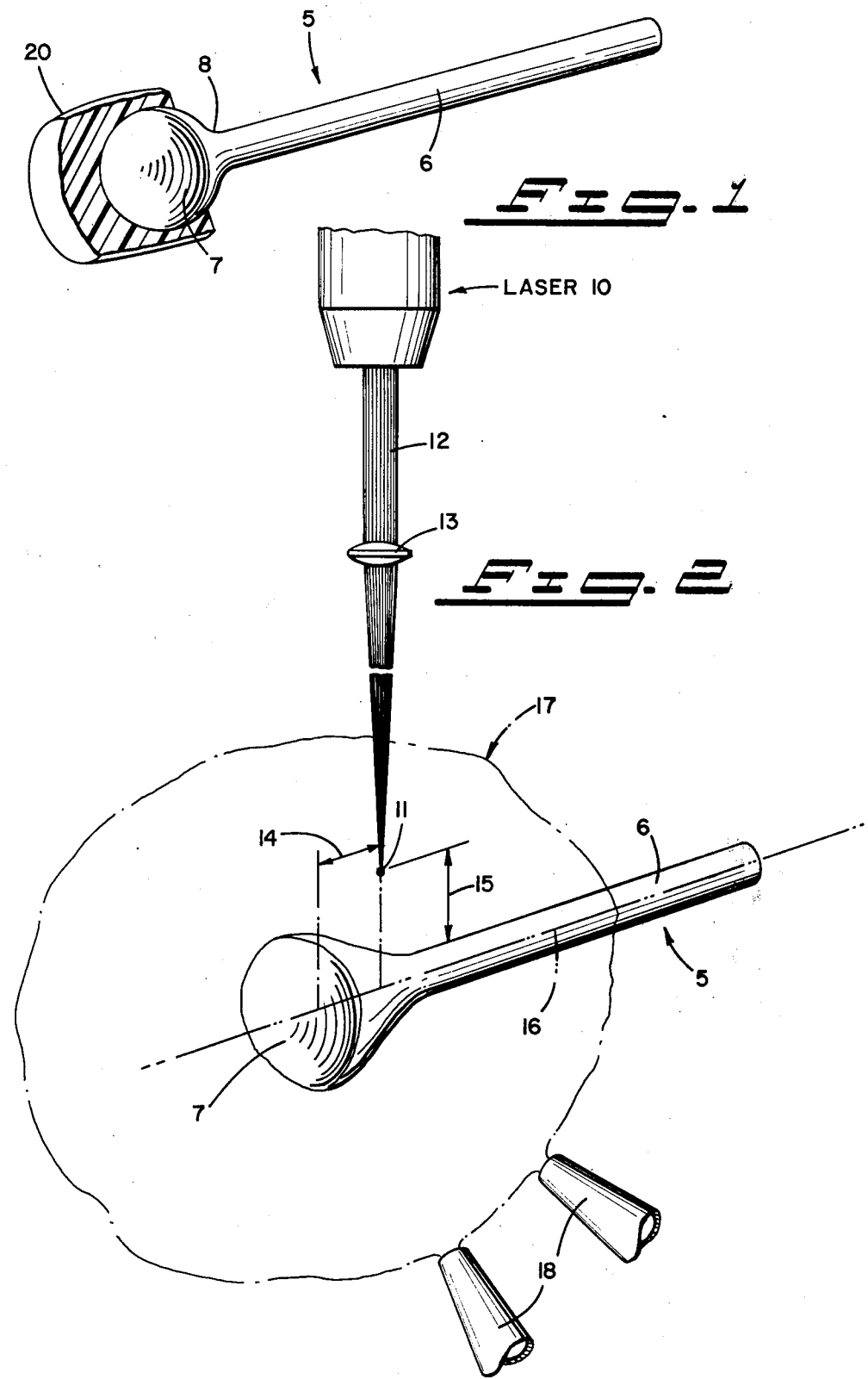

INTEGRAL BEADED STYLUS WIRE AND METHOD OF MAKING SAME

BACKGROUND OF THE INVENTION

1. Field of the Invention

This invention relates to an integral beaded stylus wire for use in a matrix printhead, and a method of making same.

2. Prior Art

High speed printers capable of printing a character in milliseconds enjoy widespread use in computer applications. Since the limiting factor on the rate of computer output is the time required for the actual printing function, efforts are continually ongoing to develop a faster and more efficient means of high speed printing. A component of the high speed printer which is highly successful and widely used to perform the actual printing function is a matrix printhead.

The matrix printhead relies on a plurality of thin elongated wires to physically impress the ink onto the paper. These wires are commonly referred to as stylus wires. When a particular letter or character is to be printed, an appropriate set of these wires is thrust forward against an inked ribbon forcing the ribbon onto the paper. Each wire has an impact receiving end and a printing end which contacts the ribbon so that a minute dot is imprinted on the paper. The result is a pattern of dots formed on the paper in a configuration corresponding to the desired character.

In the past, the enlargement or head formed at one end of the wire consisted of a spiral or pig-tail like loop of wire covered in plastic. This wire was extremely weak at the joint where the pig-tail loop met the wire stem, requiring that the wire be handled with great care. These pig-tail type wires were very susceptible to high stress concentrations, fatigue, and eventual failure in the matrix printhead application. The common failure encountered was a breaking off of the pig-tail loop from the wire stem due to the inherent weakness of the connection joint under compression.

It is an object of the present invention to provide a printwire that is not inherently weak or brittle, but is strong and resilient so as not to break or crack even after a relatively large number of compressive applications. Preferably, the wire remains firm under compression while impressing the dot upon the paper, with the flexibility of the wire allowing it to bend slightly to relieve the stress. When the compressive force is relaxed, the resiliency of the wire enables it to spring back into its original shape.

Many of the stylus wires currently in use were formed from a metal having characteristics of strength and resiliency. But the forming techniques used to shape the pig-tail loop or similar enlargement on the end of the relatively long metal wire resulted in the wire head and connecting joint losing those desirable properties of the metal. In addition, these forming techniques proved to be cumbersome and inefficient in producing a consistent head shape in a mass production environment.

It is a further object of the present invention to provide a method of forming a reliable enlargement onto the thin metal wire without losing the advantageous physical properties or characteristics of the metal. It is also an objective that this method yield consistent wire head shapes at a high rate of production.

BRIEF SUMMARY OF THE INVENTION

These and other objectives are achieved by providing a matrix printwire that has a solid sphere-like head integrally formed at one wire end, the head and wire being coaxial. To form the solid sphere the present invention uses a reliable, repeatable method of manufacture using a laser or other device to apply high localized heat to the end of the thin metal wire.

BRIEF DESCRIPTION OF THE DRAWINGS

FIG. 1 is a perspective view of the inventive stylus wire.

FIG. 2 is a diagrammatic perspective view, not to scale, showing formation of the sphere-like head at the end of the inventive stylus wire, with a laser beam being used to apply high localized heat at said wire end.

DETAILED DESCRIPTION

As shown in FIG. 1, the inventive stylus wire 5 consists of an elongated thin wire stem 6 with a sphere-like head 7 formed at one end.

Preferably, the wire stem 6 is of a length in the range of about 2 to 4 inches, and has a diameter of approximately 0.014 inches. The wire may be fabricated from tungsten, music wire, carbon steels, Elgiloy, or any comparable material that exhibits inherent characteristics of strength and resiliency, so as to withstand the repeated compression which the wire stem 6 undergoes in its printing application.

The head 7 of the printwire 5 is a solid sphere-like enlargement integrally and continuously formed at one end of the wire stem 6. The head 7 is coaxial with the wire stem 6 so that there is no bend or elbow at a junction 8. The diameter of the head 7 is generally in the range of two to four times the diameter of the wire stem 6.

An impact cap 20 substantially surrounds the sphere-like head 7, and is firmly affixed to the head 7 so as to transmit the impact force on the wire stem 6 to a printing medium. Preferably, the impact cap 20 is made of plastic and is directly formed on the sphere-like head 7, so as to encircle anywhere from slightly more than half to all of the sphere-like head 7.

The preferred use of the inventive wire 5 is in a high speed printer utilizing a matrix printhead. U.S. Pat. No. 3,929,214 issued to Donald G. Hebert shows a typical printhead employing such stylus wires. In this application the printhead typically utilizes a plurality of stylus wires arranged in a matrix configuration to perform the printing function. The wires are selectively actuated to form groups of dots which convey the form of the desired character. A selected stylus wire is thrust forward with the impact cap of the wire forcing an inked ribbon against the printing medium imparting a dot thereon. Thus, an individual print wire must be able to withstand impulsive compression and release for a great number of cycles.

The design of the inventive print wire 5 is well suited to this particular type of application. Due to the coaxial alignment of the head 7 and wire stem 6, the inventive print wire 5 exhibits superior strength under compression because the forces are applied along the common axis of the head 7 and wire stem 6. In addition, the resiliency of the metal print wire 5 allows it to bend slightly to relieve the compressive load, with a subsequent return to its original shape after relaxation of the force.

A method of making the inventive print wire 5 is illustrated in FIG. 2, which shows the molten sphere 7 being formed at the end of the wire stem 6. This illustration shows the use of a laser 10, but alternative methods of applying high localized heat such as Heliarc or plasma welding, or induction heating are also envisioned. The method shown uses the laser 10 to apply high localized heat at a focal point 11 located near the end of the wire stem 6 to be melted. This method of forming the solid sphere-like head 7 allows the molten portion to retain the strength and resiliency characteristics of the metal after hardening.

For this process a YAG, pulse type of laser 10 is preferred. This laser 10 normally emits a concentrated beam of light 12 having a uniform circumference. The first step in the process is to position a focusing lens 13 somewhere within the beam path 12 so that the beam 12 will converge to a defined focal point 11. The lens generally used has a 4 inch focal length meaning that the focal point 11 is 4 inches from lens 13 as shown in FIG. 2.

After having established the location of the laser beam focal point 11, the next step is to precisely position the wire stem 6 in relation to the focal point 11. The wire stem 6 must be accurately positioned with respect to the focal point 11 because their positioning determines the size of the sphere 7 and its alignment with respect to the wire stem 6. The wire stem 6, which initially has a uniform circumference, is placed such that the focal point 11 is at a certain distance 14 from the end of the wire stem 6. The distance 14 is preferably measured rearwardly along the wire stem 6. The wire stem 6 must also be positioned such that the focal point 11 is at a distance 15 from the perimeter of the wire stem 6, and in line with the wire stem axis. Distances in the following ranges have been found to yield a sphere 7 of desired shape and alignment: distance 14 being between 1 to 4 times the expected sphere diameter, and distance 15 being between 1 to 5 times the expected sphere diameter. For example, a sphere 7 with a diameter between 0.03 to 0.035 inches can be produced by selecting the following distances that fall within the specified ranges; distance 14 being 0.083 inches, and distance 15 being 0.10 to 0.12 inches from the perimeter, and in line with the axis, of the wire stem 6.

The next step in the process is to provide an inert atmosphere 17 to prevent oxidation of the metal in the molten state. This is preferably accomplished by spraying gaseous argon or nitrogen around the wire stem 6. The gaseous argon or nitrogen exits from small jets 18 (approximately 0.25 inches in diameter) located in close proximity to the wire stem 6.

The final step in the manufacturing process is activation of the laser 10. The intensity of the laser beam 12 and the time duration for which it is on determine the extent of vaporization of the molten metal. As mentioned earlier the desired result is that the hardened sphere 7 be coaxial with the wire stem 6, and that the entire structure retain or exceed the strength and resiliency characteristics of the original wire. To achieve this it is necessary that the sphere 7 in its molten state does not droop from the end of the wire stem 6 so as to end up in misalignment. Surprisingly, it was discovered that gravitational forces are secondary in their affect on the molten sphere 7. Testing has determined that drooping of the molten sphere 7 is primarily a function of the vaporization that takes place.

The reaction forces from the expulsion of the vaporized metal particles tend to move the molten sphere 7 off center of the wire stem axis 16. Thus, it is desired to generate a beam of intensity and time duration sufficient to form a coaxially aligned spherical head 7, but insufficient to cause a degree of metal vaporization the reaction force of which would distort the shape and alignment of the head 7. Laser operation according to the following exemplary specifications was found to be satisfactory: a pulse length in the range of 1.6 to 3.2 milliseconds, a pulse rate in the range of about 40 to 50 pulses per second, an exposure duration of about 1.0 seconds, an energy per pulse of 0.8 joules, and an average laser power in the range of 30 to 40 watts.

The method of manufacture as set out above produces a reliable, repeatable enlargement on the end of the wire stem 6 at a high rate of production. The laser beam 12 causes little or no loss in the strength and resiliency characteristics of the metal wire in that region that had been melted.

While a preferred embodiment of the present invention has been described herein, it should be clear that the disclosed invention may be modified in many respects while still retaining the essential features and advantages. Accordingly, the scope of the invention is defined, not be the disclosed embodiment, but rather by the following claims.

What is claimed is:

1. A stylus wire for use in a matrix printhead, comprising:
    a thin, elongated metal stem, having first and second axial ends, with a continuous and integral solid sphere-like head at said first axial end, and
    an impacting means, affixed to and partially surrounding said head, for transmission to a printing medium of a compressive force exerted substantially axially against said second axial end during a printhead operation.

2. A stylus wire according to claim 1 wherein said elongated wire stem and said head are substantially coaxial.

3. A stylus wire according to claim 2 wherein said stem is cylindrical with said head having a diameter in the range of 2 to 4 times the diameter of said cylindrical stem.

4. A stylus wire for use in a matrix printhead, comprising:
    a thin, elongated cylindrical metal stem, having a continuous and integral solid sphere-like head at one end, the diameter of said head being in the range 2 to 4 times the diameter of said stem, said stem and said head being of substantially uniform strength and resiliency to permit said stem to bend in compression and return to its original shape upon relaxation of a compressive force applied substantially axially on said stem during a printhead operation; and
    impacting means, formed at least partially to surround said head and be physically fixed thereto, for transmission, during said printhead operation, of said axially exerted force to a printing medium.

5. A method of printhead stylus wire formation comprising the following steps:
    providing a localized area of intense heat;
    positioning an end of said wire and said localized area of intense heat within a certain proximity of each other, said certain proximity determining the size of said sphere to be formed at the end of said wire;

providing an inert atmosphere around said wire end;
while maintaining said inert atmosphere around said wire end, applying said heat at an intensity and for a time duration sufficient to form a coaxially aligned sphere-like head at said wire end, but insufficient to cause a degree of metal vaporization the reaction force of which would distort said coaxial alignment of the formed head and the axis of said wire; and
providing an impacting cap on said sphere-like head, said cap substantially surrounding said formed sphere-like head.

6. A method according to claim 5 wherein the source of said intense heat is a laser.

7. A method according to claim 5 wherein the source of said intense heat is a welder.

8. A stylus wire manufactured by the process of claim 5.

9. A method according to claim 5 wherein the source of said intense heat is provided by induction heating.

10. A method of integrally forming a solid sphere-like head at one end of a thin, elongated metal wire, said method comprising the following steps:
focusing a laser beam to converge at a focal point;
relatively positioning said wire and said laser beam focal point within a certain proximity of each other, said certain proximity determining the size of said sphere-like head to be formed at the end of said wire;
providing an inert atmosphere around said wire;
while maintaining said inert atmosphere around said wire, activating said laser so as to generate a beam of intensity and time duration sufficient to form a coaxially aligned sphere-like head at one end of said wire but insufficient to cause a degree of metal vaporization the reaction force of which would distort said coaxial alignment of the formed head and the axis of said wire; and
affixing an impact cap to said head, said cap partially encircling said head.

11. A method according to claim 10 wherein said step of focusing is with focal length approximately four inches, and wherein said laser beam focal point is spaced from the axis of said wire and rearward of said wire end at which said sphere-like head is to be formed.

12. A method according to claim 11 wherein said focal point is spaced from said wire axis at a distance of 1 to 5 times the desired diameter of said sphere-like head.

13. A method according to claim 12 wherein said focal point is spaced rearwardly from said wire end at which said sphere-like head is to be formed at a distance of 1 to 4 times the desired diameter of said sphere-like head.

14. A method according to claim 13 wherein said proximity of said wire to said focal point to produce a sphere-like head having a diameter in the range of 0.03 to 0.035 inches is as follows:
said focal point is approximately 0.083 inches rearward of said wire end at which said sphere-like head is to be formed; and
said focal point is spaced a distance in the range of 0.1 to 0.12 inches from the perimeter, and in line with said axis, of said wire.

15. A method according to claim 14 wherein said wire is exposed to between 40 and 50 pulses of said laser beam at a pulse length in the range of 1.6 to 3.2 milliseconds, and said laser beam has an energy per pulse of 0.8 joules with said laser having an average power of 30 to 40 watts.

16. A stylus wire manufactured by the process of claim 10.

* * * * *